Dec. 17, 1968  M. CAPAUL ETAL  3,416,886
PROCESS FOR THE MANUFACTURE OF HYDROXYLAMINE SULFATE SOLUTIONS
Filed April 27, 1966
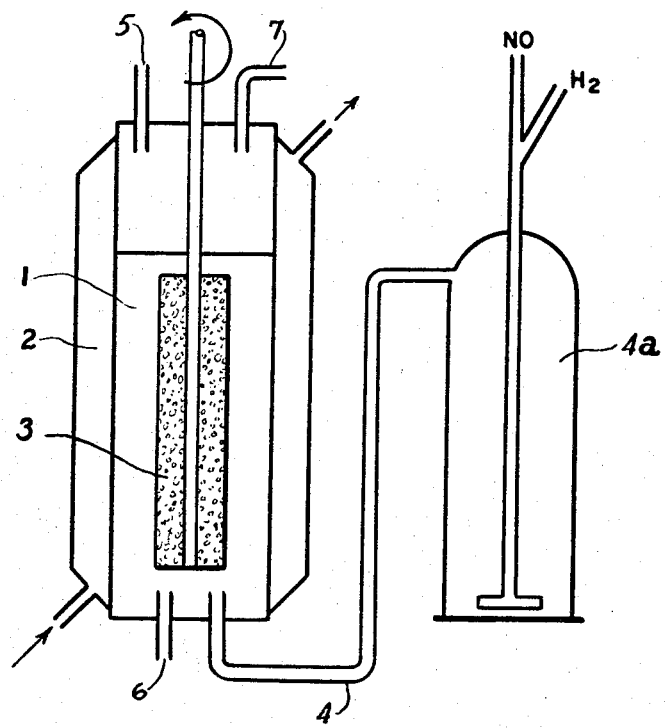
INVENTORS
MARCEL CAPAUL
KOICHI MATSUYA
MAX EDINGER

United States Patent Office 3,416,886
Patented Dec. 17, 1968

3,416,886
PROCESS FOR THE MANUFACTURE OF HY-
DROXYLAMINE SULFATE SOLUTIONS
Marcel Capaul, Bonaduz, Grisons, Koichi Matsuya, Fels-
berg, Grisons, and Max Edinger, Chur, Switzerland,
assignors to Inventa A.G. fur Forschung und Patent-
verwertung, Zurich, Switzerland
Filed Apr. 27, 1966, Ser. No. 545,762
Claims priority, application Switzerland, May 1, 1965,
6,170/65
5 Claims. (Cl. 23—117)

ABSTRACT OF THE DISCLOSURE

A process for the manufacture of hydroxylamine sulfate by the reduction of nitric oxide with hydrogen in aqueous sulfuric acid solution and in the presence of platinum catalysts. In order to hold the formation of byproducts to a minimum, a minor quantity of preformed hydroxylamine plus ammonium sulfate is initially present, and the reaction temperature is selectively and successively varied in dependence of the molar proportions of free sulfuric acid to total hydroxylamine sulfate plus ammonium sulfate present. The process is suitable for continuous and batch production.

---

The invention relates to a process for the manufacture of hydroxylamine sulfate solutions. More particularly, it relates to a process which can be carried out batchwise or continuously and wherein the formation of byproducts is held at a minimum.

The reduction of nitric oxide with hydrogen in aqueous sulfuric acid solution in the presence of platinum catalysts is known. It also is known that the speed with which the hydroxylamine sulfate forms increases with rising temperatures, so that the use of elevated temperatures is desirable. On the other hand, at higher temperatures the formation of byproducts also increases, especially that of ammonium sulfate.

It now has been found unexpectedly that hydroxylamine sulfate can be produced in the manner described above even at comparatively high temperatures with correspondingly increased yields without the formation of larger amounts of byproducts, if the reaction mixture contains a definite excess of free sulfuric acid in the molar proportions of the latter to the total hydroxylamine sulfate plus ammonium sulfate.

Hence, the expected rise in the ammonium sulfate formation with increasing temperatures can be prevented by the process according to the invention, as will be explained in detail below, in such a manner that even with increased space-time-yield the ratio of hydroxylamine to ammonium sulfate remains practically unchanged. This means that a space-time-yield is attained in the production of hydroxylamine by the reduction of nitric oxide which never before had been obtained.

The salient feature of the process for the manufacture of hydroxylamine sulfate by the reduction of nitric oxide with hydrogen in aqueous sulfuric acid solution in the presence of platinum catalysts is the selection of reaction temperatures in dependence of the molar proportions of free sulfuric acid to the total hydroxylamine sulfate plus ammonium sulfate. In a preferred embodiment of the invention the reaction temperature is selected in dependence of said molar proportions so that a temperature decrease from 80 to 35° C. corresponds to molar proportions declining from 1.5:1 to 0.3:1.

It is of particular importance that the discovery of the relationship of the molar proportions of sulfuric acid to total hydroxylamine sulfate plus ammonium sulfate and of the temperature permits an especially advantageous production not only in batchwise operations, by selecting the reaction temperature in accordance with the molar proportions named above, but particularly that in a continuous operation the reaction temperature can be adapted to suit the prevailing conditions in order to attain optimum yield and minimal amounts of byproducts. These prevailing conditions are the molar proportions named. The best and easiest temperature adjustment is effected in dependence of the degree of reaction when the reaction steps are carried out in separate containers or reactors. Such a procedure is given in Example 2 below.

The pH values existing under the conditions named in the reaction mixture are of no practical consequence.

It has been found in batchwise operation that the proportion of the yield on hydroxylamine sulfate and ammonium sulfate reaches a maximum per definite amount of free sulfuric acid. Depending upon the selected quantity of free sulfuric acid, a definite temperature must be maintained. The lower the temperature selected, the lower the amount of free sulfuric acid with equal yield of hydroxylamine sulfate.

That the process according to the invention has definite advantages in continuous operation is shown in the following tables. These indicate yields, space-time-yields and the proportions of hydroxylamine sulfate in the end product (HX) to ammonium sulfate (AS) in dependence on the reaction temperature and on the molar proportions of free sulfuric acid to total hydroxylamine sulfate plus ammonium sulfate. The experiments from which the results given in the tables were taken, had been carried out in an experimental reactor (pilot plant), as is shown in the examples below.

The aqueous sulfuric acid reaction solution contained 3 g./l. platinum catalyst (2 wt. percent Pt on activated carbon). The reaction temperature was selected stepwise, depending upon the molar proportions of free sulfuric acid to total hydroxylamine sulfate plus ammonium sulfate, and ranged from 75 to 45° C. During different periods of time, nitric oxide and hydrogen were conducted through the solution in a proportion of 1:1.8. Thereby, with decreasing proportions of acid to product in the different experiments, the yields and space-time-yields were obtained which are listed in Table 1.

In Tables 2 and 3, the yields are shown obtained at isothermic operation and 55 and 65° C., respectively, under otherwise like conditions.

TABLE 1

| Temperature, ° C. | Space-Time Yield, g. HX-Sulfate/Lh | $H_2SO_4/HX+AS$ | Yield, Percent | HX/AS |
|---|---|---|---|---|
| 75 | 55 | 1.5 | 83 | 8.0 |
| 65 | 34 | 0.7 | 84 | 8.5 |
| 55 | 27 | 0.4 | 84 | 9.2 |
| 45 | 24 | 0.3 | 85 | 10.0 |

TABLE 2

| Temperature, ° C. | Space-Time Yield, g. HX-Sulfate/Lh | $H_2SO_4/HX+AS$ | Yield, Percent | HX/AS |
|---|---|---|---|---|
| 65 | 34 | 1.5 | 83 | 8.4 |
| 65 | 34 | 0.7 | 84 | 8.5 |
| 65 | 4 | 0.4 | 10 | 0.12 |

TABLE 3

| Temperature, ° C. | Space-Time Yield, g. HX-Sulfate/Lh | $H_2SO_4/HX+AS$ | Yield, Percent | HX/AS |
|---|---|---|---|---|
| 55 | 27 | 1.5 | 85 | 9.5 |
| 55 | 27 | 0.7 | 83 | 9.3 |
| 55 | 27 | 0.4 | 84 | 9.2 |
| 55 | 13 | 0.3 | 40 | 0.8 |

The invention now will be further explained in the following examples and with reference to the accompanying drawing which is a flow sheet of a reactor as used in the experiments leading to the results shown in the tables. However, it should be understood that all this is given merely by way of illustration, and not of limitation, and that numerous changes may be made in the details without departing from the spirit and the scope of the invention as hereinafter claimed.

EXAMPLE 1

Reaction vessel 1, equipped with a dual jacket 2, was filled with 1 liter 4 N sulfuric acid (aqueous) which contained 3 g. platinum catalyst consisting of 2 wt. percent Pt deposited on activated carbon. The catalyst was kept in suspension by means of agitator 3. The temperature was kept at the desired level by a conventional regulating device (not shown). In a vessel 4a, nitric oxide and hydrogen were mixed in volume proportions of 1:1.8 and introduced into the reactor by way of conduit 4. After completion of the reaction, the solution was removed from the reactor by way of conduit 6. Off-gases were drawn off through conduit 7.

After a first two-hour period of gas introduction, wherein 17.7 Nl. NO and 32 Nl. $H_2$ per hour were added at 75° C., the reaction solution contained 123 g. $H_2SO_4$, 109 g. hydroxylamine sulfate, and 11 g. ammonium sulfate. This solution was subjected to a second period of gas introduction at 65° C. However, 10.9 Nl. NO and 19.6 Nl. $H_2$ per hour were introduced. After 2 hours of this, the solution contained 78 g. sulfuric acid, 176 g. hydroxylamine, and 17 g. ammonium sulfate.

In a further reaction period, the above solution was treated at 45° C. with 7.9 Nl./h. NO and 14.2 Ni./h. $H_2$. After two hours, the solution contained 45 g. sulfuric acid, 226 g. hydroxylamine sulfate, and 21 g. ammonium sulfate. This corresponds to a total yield of 85 percent hydroxylamine sulfate. The proportion of hydroxylamine sulfate to ammonium sulfate is 8.7:1.

The term "Nl." used in these examples means "normal liters," i.e., liters at normal conditions, 760 mm. Hg and 20° C.

EXAMPLE 2

For a continuous operation, three reaction vessels as shown in the drawing were series-connected. The reaction product from the first reactor was drawn off through conduit 6 and conducted into the second reactor through line 5. In the same manner, the product was transferred from the second into the third reactor. From the latter, the reaction product was removed through conduit 6.

Each reactor was equipped with individual temperature regulators so that operation could be carried out at different temperatures. Fresh sulfuric acid, 250 ml./h. aqueous solution containing 98 weight percent pure $H_2SO_4$, was mixed with the catalyst recovered from the third reactor and introduced into the reaction.

1 liter of an aqueous solution of 244 g. $H_2SO_4$, 222 g. hydroxylamine sulfate, 22 g. ammonium sulfate and 3 g. catalyst as described above, was introduced into the first reactor. The temperature was held at 75° C. The second reactor contained 1 liter of an aqueous solution of 162 g. sulfuric acid, 344 g. hydroxylamine sulfate, 34 g. ammonium sulfate and the same amount of catalyst as the first reactor. The temperature in the second stage was 65° C. The third reactor contained an aqueous solution (1 liter) of 99 g. $H_2SO_4$, 438 g. hydroxylamine sulfate, 42 g. ammonium sulfate, and the same amount of catalyst as in the other reactors. The third stage temperature was 45° C.

A gas mixture containing 17.7 Nl./h. NO and 32 Nl./h. $H_2$ was then introduced into the first reactor with agitation. Into the second reactor, a mixture of 10.1 Nl./h. NO and 18.2 Nl./h. $H_2$ was fed. The gas introduced into the third reactor consisted of 7.6 Nl./h. NO and 13.6 Nl./h. $H_2$.

An aqueous solution containing 61 g. sulfuric acid, 55.5 g. hydroxylamine sulfate and 5.5 g. ammonium sulfate was transferred per hour from the first to the second reactor. From the latter, an aqueous solution of 40.5 g. sulfuric acid, 86 g. hydroxylamine sulfate and 8.5 g. ammonium sulfate was transferred per hour into the third reactor.

From the third reactor an aqueous solution was obtained per hour containing 24.75 g. sulfuric acid, 109.5 g. hydroxylamine sulfate and 10.5 g. ammonium sulfate.

This corresponds to a total yield of 85% hydroxylamine sulfate. The proportion of hydroxylamine sulfate to ammonium sulfate is 8.4:1.

We claim as our invention:

1. A method for the production of hydroxylamine sulfate by reduction of nitric oxide by means of hydrogen in the presence of a platinum containing catalyst in aqueous sulfuric acid solution whereby ammonium sulfate is formed as a by-product characterized in that said method is carried out at a temperature of about 80° C. until the mol ratio of free sulfuric acid to the total amount of said amine and said ammonium sulfate is about 1.5 to 1.0, lowering said temperature as said ratio decreases to about 35° C. until said ratio is from about 0.3 to 1.0.

2. A method according to claim 1 wherein said ratio decreases due to the formation of bases during the reaction.

3. A process according to claim 1 wherein said reduction is carried out in a plurality of reactors connected in series.

4. The process as defined in claim 1, wherein said process is carried out continuously in a plurality of steps, each said step being accomplished in a separate reaction zone.

5. The process as defined in claim 4, wherein three reaction zones are employed at temperatures of 75, 65 and 45° C., respectively.

References Cited

UNITED STATES PATENTS 3,295,925 1/1967 Füeg et al. _____ 23—190
3,313,595 4/1967 Jockers et al. _____ 23—190

OSCAR R. VERTIZ, Primary Examiner.

H. S. MILLER, Assistant Examiner.

U.S. Cl. X.R.

23—190, 288